(No Model.) 4 Sheets—Sheet 1.

F. W. HOWELL.
ROLLER MILL.

No. 439,596. Patented Oct. 28, 1890.

Witnesses: Theodore L. Popp, Geo. J. Buchheit Jr.

Inventor: F. W. Howell
By Wilhelm & Bonner, Attorneys (No Model.) 4 Sheets—Sheet 2.
F. W. HOWELL.
ROLLER MILL.
No. 439,596. Patented Oct. 28, 1890.
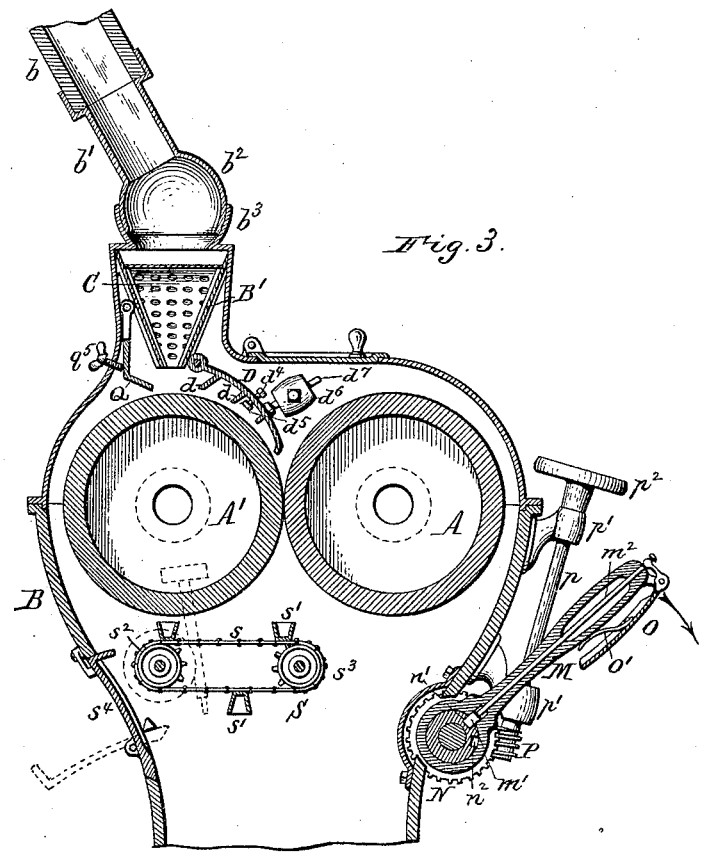
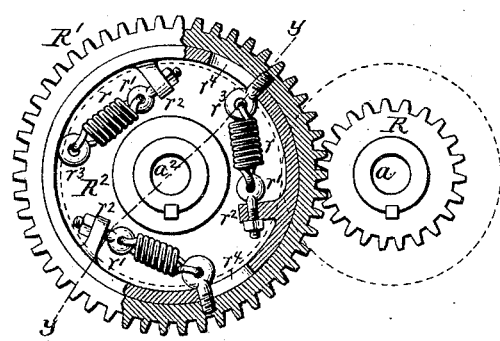
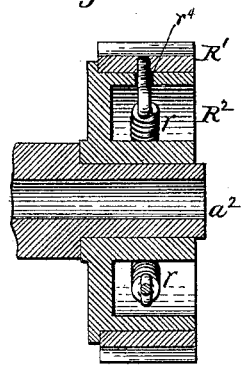

(No Model.)
F. W. HOWELL.
ROLLER MILL.
No. 439,596. Patented Oct. 28, 1890.
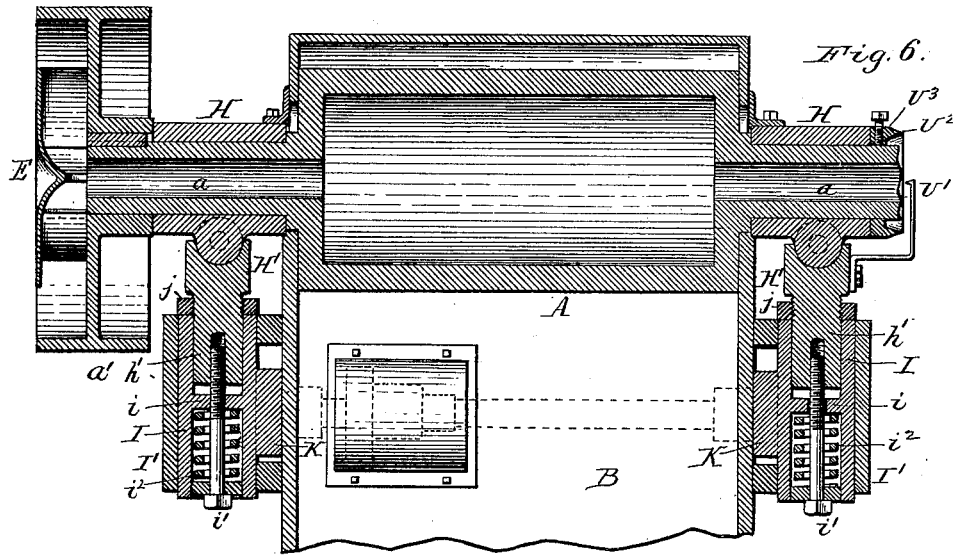
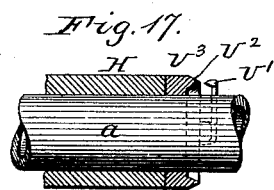
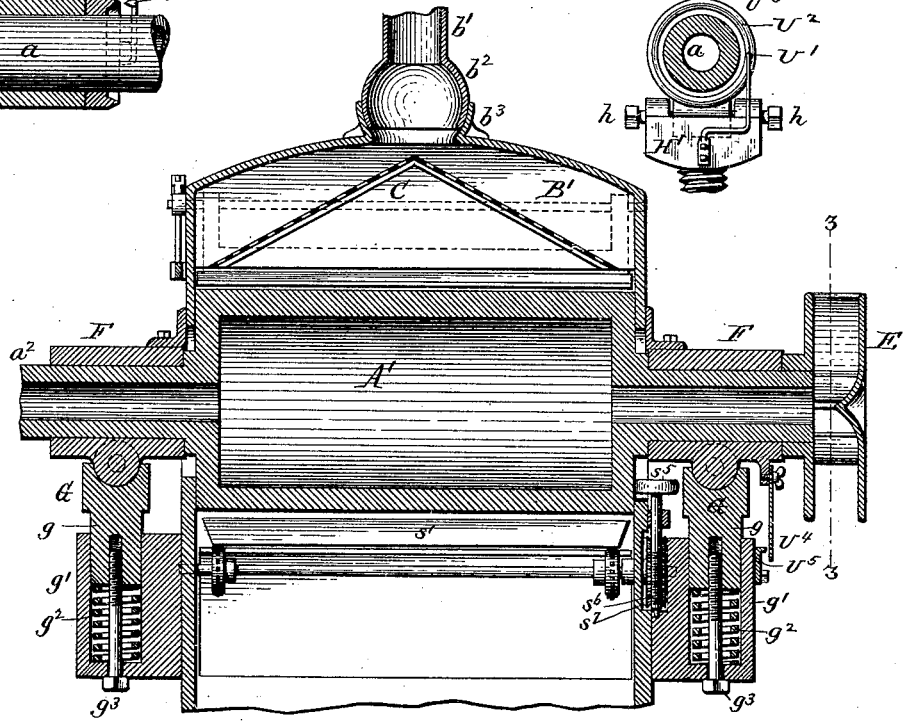
Witnesses.
Theodore L. Popp
Geo. J. Buchheit Jr.
F. W. Howell Inventor
By Wilhelm Bonner
Attorneys.

(No Model.)

F. W. HOWELL.
ROLLER MILL.

No. 439,596.

4 Sheets—Sheet 4.

Patented Oct. 28, 1890.

Witnesses: Theodor L. Popp, Geo. J. Buchheit Jr.

F. W. Howell, Inventor
By Wilhelm Bonner, Attorneys.

THE NORRIS PETERS CO., PHOTO-LITHO., WASHINGTON, D. C.

UNITED STATES PATENT OFFICE.

FREDERICK W. HOWELL, OF BUFFALO, NEW YORK, ASSIGNOR TO MARGARET T. HOWELL, OF SAME PLACE.

ROLLER-MILL.

SPECIFICATION forming part of Letters Patent No. 439,596, dated October 28, 1890.

Application filed April 12, 1886. Serial No. 198,555. (No model.)

*To all whom it may concern:*

Be it known that I, FREDERICK W. HOWELL, of the city of Buffalo, in the county of Erie and State of New York, have invented a new and useful Improvement in Roller-Mills, of which the following is a specification.

This invention relates to an improvement in that class of roller-mills which are employed for the reduction of grain in the manufacture of flour and for similar purposes, and has for its object to improve the construction and operation of the various parts which enter into the construction of the mill.

My invention consists to that end of the improvements, which will be hereinafter fully set forth, and pointed out in the claims.

Figure 1:
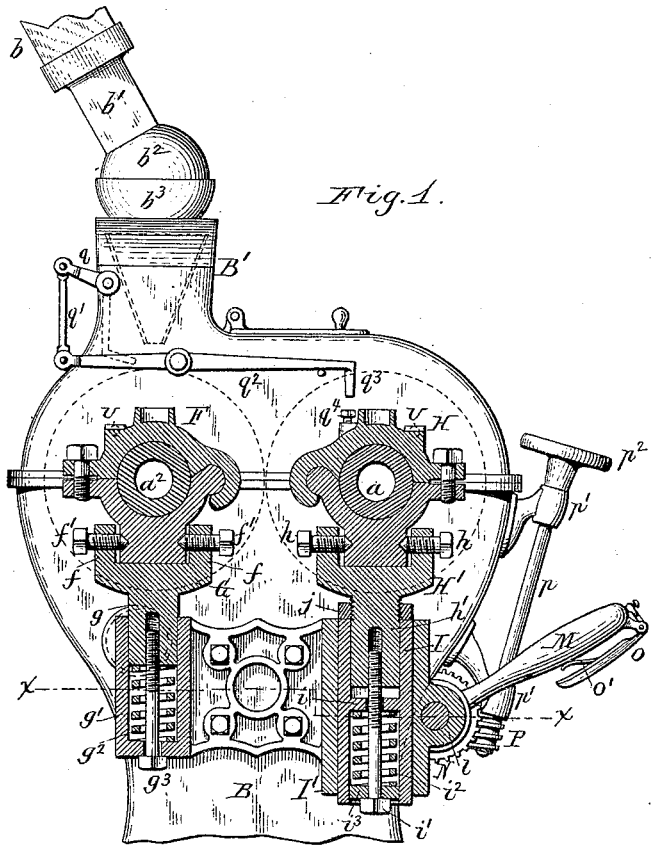
Figure 2:
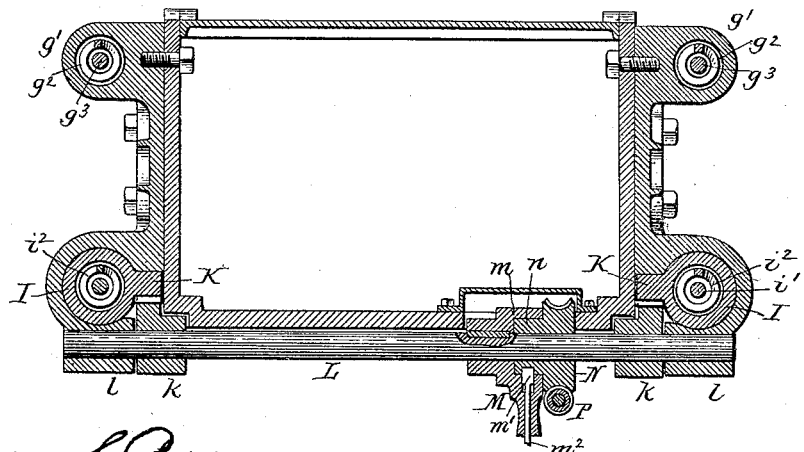
Figure 8:
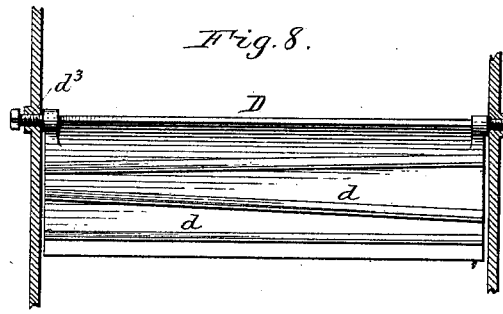
Figure 9:
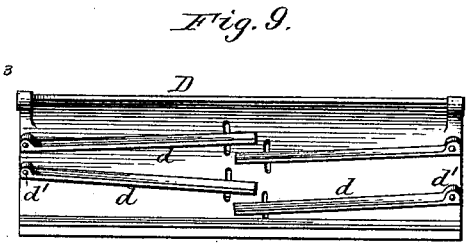
Figure 10:
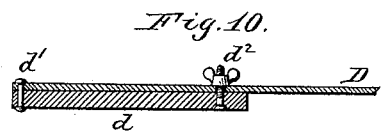
Figure 11:
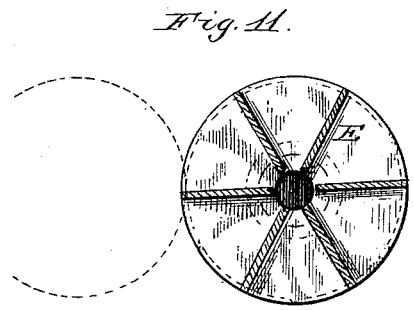
Figure 12:
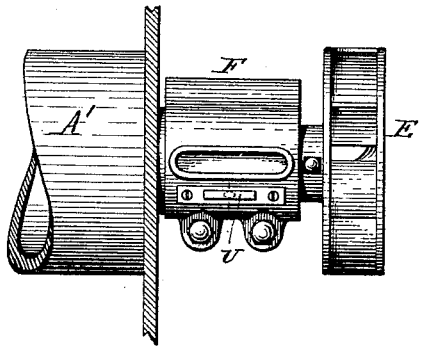
Figure 13:
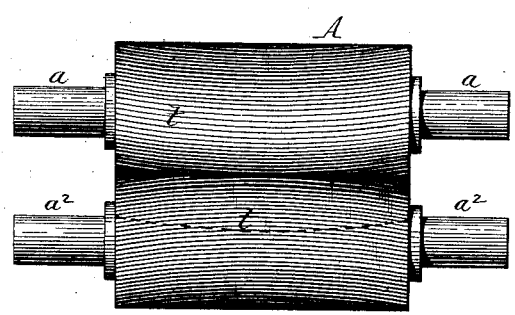
Figure 14:
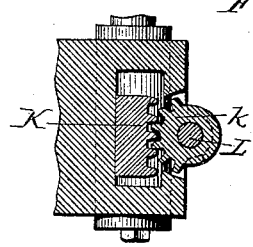

In the accompanying drawings, consisting of four sheets, Figure 1 is a sectional elevation of a roller-mill provided with my improvements. Fig. 2 is a horizontal section in line $x\ x$, Fig. 1. Fig. 3 is a vertical section of the roller-mill. Fig. 4 is a sectional elevation of the gear mechanism whereby the rollers are connected. Fig. 5 is a cross-section in line $y\ y$, Fig. 4. Fig. 6 is a longitudinal vertical section of the fast roller and connecting parts. Fig. 7 is a longitudinal section of the slow roller and connecting parts. Figs. 8 and 9 are elevations of the hood, which distributes the material upon the slow roller. Fig. 10 is a sectional view of one of the adjustable slats, on an enlarged scale. Fig. 11 is a sectional elevation in line $z\ z$, Fig. 7, of one of the ventilating-fans. Fig. 12 is a top plan view of one of the roller-bearings. Fig. 13 is a plan view of the rollers, showing the dress of the same. Fig. 14 is a sectional elevation showing the gear-rack and connecting parts applied to the bearings of the fast roller. Fig. 15 is a cross-section of the hub of the worm-wheel, which forms part of the spreading device. Fig. 16 is a horizontal section of one of the roller-shafts and the collar secured thereto. Fig. 17 is a side view of said collar.

Like letters of reference refer to like parts in the several figures.

A represents the fast roller, which is provided with journals $a$ and driven by means of a pulley $a'$ or other suitable means.

A' represents the slow roller, provided with journals $a^2$ and geared with the fast roller, so as to maintain the desired differential rate of speed.

B represents the roller-casing, which incloses the rollers A A' and which may be of any suitable form.

B' represents the feed-hopper, which is arranged in the upper portion of the roller-casing above the slow roller A' and which receives the material from the feed-spout $b$. The latter is provided with a discharge-nozzle $b'$, having at its end a spherical knuckle $b^2$, which is seated in a spherical socket $b^3$. This socket is formed in the upper portion of the roller-casing above the feed-hopper B', so that the casing can be connected with feed-spouts standing at various angles.

C represents a perforated diaphragm arranged in the feed-hopper B' and composed of two inclined perforated plates connected together at their highest point centrally in the feed-hopper and inclining outwardly toward both ends of the hopper, as clearly shown in Fig. 7. This inclined diaphragm serves to effect a preliminary distribution of the material over the whole length of the rollers, the material passing through the perforations of the diaphragm upon the slow roller below the same.

D represents the distributing-hood, which is arranged over that portion of the slow roller which carries the material between the rollers. This hood is provided on its under side with inclined slats $d$, which distribute the material over the whole length of the roller. The slats $d$ may be rigidly secured to the hood D, as represented in Fig. 8, or they may be pivoted to the hood at $d'$ and made adjustable by screws $d^2$, as represented in Figs. 9 and 10, so that their inclination can be adjusted.

The hood D is pivoted to the casing B by bolts $d^3$, and its movement toward the roller A' is limited by a set-screw $d^4$, applied to the hood and resting against a stop $d^5$ formed on the casing B. This set-screw is so adjusted as to permit the hood D to rest upon the material on the roller and distribute the same without coming in actual contact with the roller.

$d^6$ represents a weight which is adjustably secured to an arm $d^7$, formed on the hood D, and which holds the hood against the material on the roller. It is obvious that a spring may be substituted for the weight. The hood D serves not only to distribute the material over the roller, but also prevents the material from dusting out when the door in the top of the casing is opened. The rollers A A' and their journals are made hollow, and each roller is provided with a revolving ventilator or fan E, which causes an air-current to flow through the hollow roller and its journals, thereby keeping the roller and its journals cool. As shown in the drawings, the fans E are secured directly to the roller-journals.

F represents the bearings in which the journals $a^2$ of the slow roller A' are supported.

G represents vertically-movable supports, which carry the bearings F and are provided with cylindrical shanks $g$, which enter cylindrical sockets $g'$, secured to the casing B.

$g^2$ is a spring interposed between the lower end of each shank $g$ and the bottom of its socket $g'$.

$g^3$ is a bolt which passes through the bottom of each socket $g'$ and taps into the shank $g$, so that by tightening or releasing the bolt the support G and the bearing F attached thereto are lowered or raised. It is obvious that each bearing F can yield downwardly by compressing the spring $g^2$. Each support G is provided with two vertical lugs $f$, which carry horizontal pivots $f'$, arranged at right angles to the axis of the bearing, so that the latter can turn on these pivots in the plane of the axis of the roller. These pivots are screw-threaded, so that the bearing can be adjusted horizontally at right angles to the roller by adjusting the pivots. Each bearing is therefore capable of four adjustments—viz., a vertical adjustment by raising and lowering the support G in its socket, a turning adjustment in the horizontal plane by turning the shank $g$ in its socket, a swinging adjustment in the plane of the roller-axis by swinging the bearing on the pivots $f'$, and a horizontal adjustment in a plane at right angles to the roller-axis by adjusting the pivots $f'$.

H represents the bearings in which the journals $a$ of the fast roller A are supported.

H' represents vertically-movable supports to which the bearings H are attached by the horizontal screw-threaded pivots $h$.

$h'$ represents the vertical cylindrical shank forming the lower portion of each support H' and entering a cylindrical sleeve I, which fits into a vertical cylindrical socket I', secured to the casing B. The sleeve I is provided with a horizontal diaphragm $i$, through which passes the vertical adjusting-bolt $i'$, which taps into the shank $h'$. A spring $i^2$ is interposed between the diaphragm $i$ of each sleeve I and a washer $i^3$, which latter bears against the head of the adjusting-bolt. The upper portion of the shank $h'$ is provided with an external screw-thread, to which is applied a screw-nut $j$, which limits the downward movement of the shank in the sleeve I. Each roller-bearing H can yield upwardly by compressing the spring $i^2$, and each of these roller-bearings can be adjusted vertically by means of the screw-nut $j$ and adjusting-bolt $i'$. The roller-bearings H are capable of the same four adjustments which have been described with reference to the bearings F.

K represents vertical rack-bars formed on the inner sides of the sleeves I, as clearly represented in Fig. 2, and $k$ represents gear-segments which mesh with the rack-bars K and are secured to a horizontal shaft L. The latter is journaled in bearings $l$, which are formed on the sleeves I. By turning the shaft L in one or the other direction both of the sleeves I are raised or lowered simultaneously.

M represents a hand-lever, which is rigidly secured to the shaft L, and whereby the latter can be turned.

N is a worm-wheel, which is mounted loosely on the shaft L and provided with a hub $n$, which enters the recessed hub $m$ of the hand-lever M.

$m'$ is a sliding bolt or pawl arranged in the hand-lever M and having its stem $m^2$ extending through the hand-lever and projecting beyond the outer end thereof.

O represents a thumb-piece having the form of a bell-crank lever and pivoted between lugs at the outer end of the hand-lever. The short arm of the thumb-piece O is connected with the outer end of the stem $m^2$, and the long arm extends downwardly on the under side of the hand-lever and is provided with a spring O', bearing against the same, whereby the pawl $m'$ is pressed toward the hub $n$ of the worm-wheel N. The hub $n$ is provided with two notches $n'$ $n^2$, in either of which the sliding pawl may be engaged.

P represents a worm which meshes with the worm-wheel N and is secured to the lower end of a shaft $p$. The latter is journaled in bearings $p'$, secured to the casing B, and is provided in its upper end with a hand-wheel $p^2$. By turning the worm P the worm-wheel N is turned, and this motion of the worm-wheel is transmitted to the shaft L by the pawl $m'$ entering the recess $n'$ of the hub $n$ of the worm-wheel. In this manner the shaft L is turned by means of the hand-wheel P, and the bearings H are thereby raised or lowered simultaneously for regulating the grinding adjustment. The hand-lever M turns with the shaft L when the latter is so rotated. Upon disengaging the pawl $m'$ from the hub $n$ the shaft L can be turned by means of the hand-lever M without changing the position of the worm-wheel N, which is held in place by the worm P. Upon so turning the shaft and hand-lever in the direction of the arrow in Fig. 3 and locking the hand-lever by engaging the pawl $m'$ in the notch $n^2$, the roller-bearings H and the roller A journaled therein are raised sufficiently to spread the rollers as may be necessary for starting or stopping the same without disturbing the grinding adjustment. Upon turning the hand-lever M and the shaft L back and engaging the pawl $m'$ again in the notch $n'$ the roller A is returned to its former position.

The sockets in which the roller-bearings are supported vertically are arranged at such a distance from each other that the rollers cannot come in actual contact with each other by the grinding adjustment, which is effected vertically and at right angles to the plane in which the two rollers are arranged. The slow roller is cushioned downwardly by the spring $g^2$, and the fast roller is cushioned upwardly by the spring $i^2$, whereby the rollers are enabled to separate readily when a hard substance of abnormal size enters between the rollers.

Q represents the pivoted cut-off valve, which is adapted to close the discharge-opening of the feed-hopper. The valve Q is pivoted in the upper portion of the casing B, and is provided on the outer side of the casing with an arm $q$, which is connected by a rod $q'$ with the actuating-lever $q^2$. The latter is moved by one of the bearings H in such manner that when the bearings are raised for spreading the rollers the valve Q is closed. When the bearings are lowered, the valve Q is opened by gravity. The end of the actuating-lever $q^2$ is provided with a depending finger $q^3$, which is struck by a set-screw $q^4$, applied to one of the bearings H, and whereby the contact of the bearing with the actuating-lever can be regulated. The valve Q rests against a set-screw $q^5$ when opened.

R represents a gear-wheel secured to the shaft of the fast roller A, and R' represents a gear-rim of larger diameter, meshing with the gear-wheel R and mounted upon a wheel $R^2$, which is secured to the shaft of the slow roller A'. $r$ represents springs, whereby the gear-rim R' is connected with the supporting-wheel $R^2$ in such manner that the springs draw the gear-rim R' forwardly on the support $R^2$ in the direction in which the gear-rim rotates, thereby holding the advancing faces of the teeth of the gear-rim closely against the backs of the teeth of the gear-wheel R. If by an increase of speed in the driving mechanism the gear-wheel R should suddenly increase its speed, the springs $r$ cause the gear-rim to take part in this accelerated motion and thus prevent the jar, vibration, or frontlash which occurs in roller-mills of ordinary construction by a sudden forward movement of the driving-wheel out of its normal position, in which latter the backs of the teeth of the driving-wheel on the fast roller rest against the front sides of the teeth of the driven wheel on the slow roller, and retard the latter in roller-mills of ordinary construction by reason of the play or wear of the teeth. The springs $r$ are connected with the wheel $R^2$ by eyebolts $r'$ and lugs $r^2$ and to the gear-rim R', with eye-bolts $r^3$ passing through slots $r^4$ in the face of the wheel $R^2$.

S represents an automatic mechanism for conveying samples of the ground or crushed material from the interior of the roller-casing to a point which is convenient for inspecting the same. The sampler S consists of two endless chains or belts $s$, provided with buckets $s'$ and running around pulleys $s^2$ $s^3$. $s^4$ represents a hinged door in the end of the roller-casing, which is opened, as shown in dotted lines, for the reception of the samples discharged by the buckets $s'$. The latter extend along the whole length of the rollers, and therefore furnish samples from all points of the grinding-surfaces. The sampler may be driven by means of a friction-wheel $s^5$, worm $s^6$ and worm-wheel $s^7$, as represented in Figs. 3 and 7, or by any other suitable mechanism.

U represents spirit-levels secured to the upper sides of the bearings F and H, at one or both ends of the rollers, for the purpose of enabling the bearings and rollers to be readily placed in a horizontal position.

U' represents a pointer secured to each of the bearings for the purpose of indicating the side wear in the bearing in connection with a mark $U^2$ on the roller-shaft. The mark $U^2$ is composed of an annular projection formed on the face of a collar $U^3$, which is fastened to the roller-shaft, as represented in Figs. 16 and 17.

$U^4$ is a pointer depending from each bearing for the purpose of indicating the position of the bearing with reference to a fixed mark $U^5$ on the sockets $g'$ and I'. These devices permit the operator to determine the position of the rollers without using a proof-plate and while the rollers are running.

$t$ represents the grooves or corrugations which are formed in the working-faces of the rollers, and which may be of any suitable cross-section. These grooves or corrugations are curved or made arc-shaped lengthwise of the rollers, so that the central portion of each groove lies forwardly or backwardly of its end portions, as clearly represented in Fig. 13. When the grooves or corrugations $t$ are arranged in the same manner on both rollers—for instance, with their convex sides forwardly, as represented by full lines in Fig. 13—the grooves or ribs in the two rollers mesh with each other. When one of the rollers is reversed so that the grooves or ribs on one roller are arranged with their concave sides forwardly and on the other roller with their convex sides forwardly, as represented by dotted lines in Fig. 13, the grooves or ribs in the two rollers cross each other and produce a shearing cut. By a simple adjustment of one of the rollers, as above described, either a meshing or shearing cut can be produced at the desire of the operator.

I claim as my invention—

1. The combination, with the roller A', of a hood D, provided with slats $d$, adjustably attached to the hood, substantially as set forth.

2. The combination, with the roller A', of a pivoted hood D, provided with a set-screw $d^4$, and a case B, provided with a stop $d^5$, whereby the downward movement of the hood is limited, substantially as set forth.

3. The combination, with the roller A', of a pivoted hood D, provided with an adjustable weight $d^6$, substantially as set forth.

4. The combination, with a hollow roller having hollow journals, of a fan E, secured to one of said journals and directing an air-current through the same, substantially as set forth.

5. In a roller-mill, the combination, with a roller-journal and its bearings, of supports in which the bearings are horizontally adjustable at right angles to the roller-axis, horizontal pivots on which the bearings can be swung in the plane of the roller-axis, a vertical shank on which the bearings can be turned horizontally, and adjusting-screws whereby the bearings can be raised and lowered, substantially as set forth.

6. In a roller-mill, the combination, with the bearings F, of the supports G, each provided with horizontal pivots $f'$, and a vertical shank $g$, a sleeve $g'$, in which the shank $g$ slides vertically, a spring $g^2$, and adjusting-screw $g^3$, substantially as set forth.

7. The combination, with the roller A, journaled in vertically-movable bearings provided with springs which permit said bearings to yield upwardly, of the roller A', facing the roller A, and journaled in vertically-movable bearings provided with springs which permit said bearings to yield downwardly, substantially as set forth.

8. The combination, with the roller A and its bearings H, provided with supports H', sockets I', sleeves I, springs $i^2$, and bolts $i'$, of the roller A' and its bearings F, provided with supports G, sockets $g'$, springs $g^2$, and bolts $q^3$, substantially as set forth.

9. The combination, with the two opposing rollers, of movable bearings in which one of said rollers is journaled, said bearings being movable practically at right angles to the plane in which the two rollers are arranged, and adjusting mechanism connected with both of said movable bearings, whereby both bearings are raised and lowered simultaneously, and the distance between the opposing faces of the rollers is adjusted without risk of bringing the faces in contact, substantially as set forth.

10. The combination, with a roller A', supported in stationary bearings, of a roller A, arranged in the same horizontal plane with the roller A', bearings in which said roller A is journaled, vertical guides in which said bearings are made vertically movable, and mechanism whereby both bearings are simultaneously raised and lowered, substantially as set forth.

11. In a roller-mill, the combination, with the bearings H, of the supports H', each provided with horizontal pivots $h$ and a vertical shank $h'$, of a sleeve I, provided with a diaphragm $i$, a spring $i^2$, and adjusting-bolt $i'$, a socket I', and a screw-nut $j$, substantially as set forth.

12. The combination, with the roller A and its bearings H, of bearing-supports provided with rack-bars K, a shaft L, provided with gears $k$, a hand-lever M, secured to the shaft L, a worm-wheel N, loosely mounted on said shaft, and a coupling whereby the hand-lever can be connected with or disconnected from the wheel N, substantially as set forth.

13. The combination, with the roller A and its bearings H, of bearing-supports provided with rack-bars K, a shaft L, provided with gears $k$, a hand-lever M, secured to the shaft L and provided with a pawl $m'$, a worm-wheel N, mounted loosely on the shaft L and provided with notches $n'$ $n^2$, and a worm P, substantially as set forth.

14. The combination, with the roller A and its bearings H, of the supports H', fixed sockets I', sleeves I, provided with rack-bars K, and shaft L, provided with gears $k$, substantially as set forth.

15. The combination, with the feed-hopper B' and the cut-off valve Q, of the actuating-lever $q^2$, provided with a finger $q^3$, and the movable bearing H, provided with a set-screw $q^4$, substantially as set forth.

16. The combination, with the rollers A A' and their inclosing-casing provided with an aperture below the rollers, of a movable carrier S, arranged underneath the rollers, whereby samples of the reduced material can be delivered through said aperture, substantially as set forth.

17. The combination, with the rollers A A', of a movable carrier S, arranged underneath the rollers and composed of endless chains $s$, buckets $s'$, and carrying-pulleys $s^2$ $s^3$, substantially as set forth.

18. The combination, with the rollers A A' and case B, of a movable carrier S, arranged underneath the rollers, and a movable door $s^4$, arranged in the case below the delivering end of the movable carrier, substantially as set forth.

19. The combination, with the fast roller and the slow roller, of a pinion R, secured to the fast roller, a support $R^2$, secured to the driven roller, a gear-rim R, mounted loosely upon the support $R^2$, and a spring connecting the gear-rim with its support and drawing the gear-rim forwardly on the same in the direction in which the gear-rim rotates, thereby holding the advancing faces of the teeth of the gear-rim in close contact with the backs of the teeth of the pinion and preventing frontlash, substantially as set forth.

20. The combination, with the roller A and a gear-wheel R, secured thereto, of the roller A', provided with a wheel $R^2$, having slots $r^4$, a gear-rim R', mounted loosely on the wheel $R^2$, and springs $r$, attached to lugs $r^2$ on the wheel $R^2$ and to eyebolts $r^3$, secured to the rim R' and passing through the slots $r^4$, substantially as set forth.

21. In a roller-mill, the combination, with the supporting-frame provided with a fixed pointer $U^2$, of a horizontally-adjustable bearing provided with a pointer $U'$, substantially as set forth.

22. In a roller-mill, the combination, with a fixed socket provided with a pointer $U^5$, of a bearing provided with a shank capable of being turned in said socket and provided with a pointer $U^4$, substantially as set forth.

Witness my hand this 27th of March, 1886.

FREDERICK W. HOWELL.

Witnesses:
 JNO. J. BONNER,
 OSCAR SCHAUB.